US011935479B1

(12) United States Patent
Park et al.

(10) Patent No.: US 11,935,479 B1
(45) Date of Patent: Mar. 19, 2024

(54) ORGANIC LIGHT-EMITTING DISPLAY DEVICE AND ITS DRIVING METHOD

(71) Applicant: DB GlobalChip Co., Ltd., Seongnam-si (KR)

(72) Inventors: Cheon Wi Park, Suwon-si (KR); Jung Il Seo, Seongnam-si (KR); Jae Hong Ko, Seongnam-si (KR)

(73) Assignee: DB GlobalChip Co., Ltd., Seongnam-si (KR)

( * ) Notice: Subject to any disclaimer, the term of this patent is extended or adjusted under 35 U.S.C. 154(b) by 0 days.

(21) Appl. No.: 18/356,875

(22) Filed: Jul. 21, 2023

(30) Foreign Application Priority Data

Jun. 23, 2023 (KR) ........................ 10-2023-0081305

(51) Int. Cl.
*G09G 3/3233* (2016.01)

(52) U.S. Cl.
CPC ... *G09G 3/3233* (2013.01); *G09G 2310/0294* (2013.01); *G09G 2320/0252* (2013.01)

(58) Field of Classification Search
None
See application file for complete search history.

(56) References Cited

U.S. PATENT DOCUMENTS

2023/0197011 A1* 6/2023 Hong .................. G09G 3/3283 345/212

FOREIGN PATENT DOCUMENTS

KR 20150073694 A 7/2015
KR 20160001822 A 1/2016

* cited by examiner

*Primary Examiner* — Stephen T. Reed
(74) *Attorney, Agent, or Firm* — AEON Law, PLLC; Adam L. K. Philipp; David V. H. Cohen

(57) ABSTRACT

According to some aspects of the disclosure, an organic light-emitting display device including a display panel including a driving thin film transistor (TFT), comprises a sensing unit configured to perform a sensing operation for external compensation of the display panel, and an analog-digital converter (ADC) configured to perform a conversion operation of converting an analog value held in the sensing unit into a digital value, wherein the sensing unit comprises a basic sensing unit configured to perform a sensing operation on the driving TFT, and a dummy sensing unit configured to perform a sensing operation on changes in a gain and an offset of the ADC, and the basic sensing unit and the dummy sensing unit are in a cascade connection to each other.

20 Claims, 7 Drawing Sheets

ORGANIC LIGHT-EMITTING DISPLAY DEVICE AND ITS DRIVING METHOD

CROSS-REFERENCE TO RELATED APPLICATION

This application claims priority under 35 U.S.C. § 119 to Korean Patent Application No. 10-2023-0081305 filed on Jun. 23, 2023, in the Korean Intellectual Property Office, the entire contents of which is hereby incorporated by reference.

TECHNICAL FIELD

The disclosure relates to an organic light-emitting display device and a method for driving the same.

BACKGROUND

The contents set forth in this section merely provide background information on the present embodiments and do not constitute prior art.

Large display devices (e.g., OLED display devices) use external compensation methods to compensate for deviations in the characteristics of the driving thin film transistors (TFT) inside the pixels. The external compensation circuit compensates for deviations in electrical characteristics by measuring sensing voltages corresponding to the electrical characteristics (threshold voltages, mobility) of the driving TFTs and modulating video data in an external circuit based on the sensing voltages.

At this time, the analog-to-digital converter (ADC) included in the data drive IC SDIC may change its gain and offset by factors such as temperature and power supply voltage. Therefore, external compensation that reflects changes in the gain and offset occurring after a product is shipped is needed.

If a compensation operation for the driving TFT and a compensation operation on the changes in the gain and offset of the ADC are performed in the same SH (sample and hold) circuit array, this causes a situation in which each compensation operation section must be divided as the input value of the compensation operation for the driving TFT and the input value of the compensation operation section for the changes in the gain and offset of the ADC are different. As a result, there is a problem that the total compensation operation time is increased and compensation is not achieved accurately in a short time.

SUMMARY

An object to be achieved by the present disclosure is to provide an organic light-emitting display device capable of performing compensation in real-time for changes in the gain and offset of an ADC due to changes in temperature and power supply voltage.

Another object to be achieved by the present disclosure is to provide a method for driving an organic light-emitting display device capable of performing compensation in real-time for changes in the gain and offset of an ADC due to changes in temperature and power supply voltage.

Yet another object to be achieved by the present disclosure is to provide a sensing unit capable of performing compensation in real-time for changes in the gain and offset of an ADC due to changes in temperature and power supply voltage.

The objects of the present disclosure are not limited to the objects mentioned above, and other objects and advantages of the present disclosure that have not been mentioned can be understood by the following description and will be more clearly understood by the embodiments of the present disclosure. Further, it will be readily appreciated that the objects and advantages of the present disclosure may be realized by the means set forth in the claims and combinations thereof.

According to some aspects of the disclosure, an organic light-emitting display device including a display panel including a driving thin film transistor (TFT), comprises a sensing unit configured to perform a sensing operation for external compensation of the display panel, and an analog-digital converter (ADC) configured to perform a conversion operation of converting an analog value held in the sensing unit into a digital value, wherein the sensing unit comprises a basic sensing unit configured to perform a sensing operation on the driving TFT, and a dummy sensing unit configured to perform a sensing operation on changes in a gain and an offset of the ADC, and the basic sensing unit and the dummy sensing unit are in a cascade connection to each other.

According to some aspects, the basic sensing unit and the dummy sensing unit each comprises at least one or more sampling and hold (SH) circuits, and the SH circuit comprised in the basic sensing unit and the SH circuit comprised in the dummy sensing unit perform a sampling operation during a TSPL time (sampling time).

According to some aspects, the ADC performs the conversion operation corresponding to the basic sensing unit and the conversion operation corresponding to the dummy sensing unit in sequence within a predetermined time period.

According to some aspects, the time period comprises time intervals between a plurality of TSPL times.

According to some aspects, input voltages of the basic sensing unit and the dummy sensing unit are different from each other.

According to some aspects, the input voltage of the basic sensing unit is a value that changes according to a threshold voltage and mobility of the driving TFT, and the input voltage of the dummy sensing unit is a predetermined value in relation to the gain and the offset of the ADC.

According to some aspects, the dummy sensing unit comprises a first dummy sensing unit and a second dummy sensing unit that is different from the first dummy sensing unit.

According to some aspects, the first dummy sensing unit and the second dummy sensing unit are arranged to be spaced apart from each other based on the basic sensing unit.

According to some aspects, the basic sensing unit and the first and second dummy sensing units are in a cascade connection in order of the first dummy sensing unit, the basic sensing unit, and the second dummy sensing unit.

According to some aspects, the numbers of SH circuits comprised in the first dummy sensing unit and the second dummy sensing unit are equal to each other.

According to another aspect of the disclosure, a method for driving an organic light-emitting display device including a display panel including a driving thin film transistor (TFT), the method comprises performing, by a sensing unit, a sensing operation for external compensation of the display panel, and performing, by an ADC, a conversion operation of converting an analog value held in the sensing unit into a digital value, wherein the performing the sensing operation comprises performing, by a basic sensing unit comprised in the sensing unit, a sensing operation on the driving TFT, and performing, by a dummy sensing unit comprised in the sensing unit, a sensing operation on changes in a gain and an offset of the ADC, and the basic sensing unit and the dummy sensing unit are in a cascade connection to each other.

According to some aspects, the basic sensing unit and the dummy sensing unit each comprises at least one or more sampling and hold (SH) circuits, and the performing, by the basic sensing unit, the sensing operation on the driving TFT comprises performing, by the SH circuit comprised in the basic sensing unit, a sampling operation during a TSPL time, and the performing, by the dummy sensing unit, the sensing operation on the changes in the gain and the offset of the ADC comprises performing, by the SH circuit comprised in the dummy sensing unit, a sampling operation during the TSPL time.

According to some aspects, the performing the conversion operation comprises sequentially performing, by the ADC, the conversion operation on the basic sensing unit and the conversion operation on the dummy sensing unit within a predetermined time period.

According to some aspects, the time period comprises time intervals between a plurality of TSPL times.

According to some aspects, input voltages of the basic sensing unit and the dummy sensing unit are different from each other.

According to some aspects, the input voltage of the basic sensing unit is a value that changes according to a threshold voltage and mobility of the driving TFT, and the input voltage of the dummy sensing unit is a predetermined value in relation to the gain and the offset of the ADC.

According to some aspects, the dummy sensing unit comprises a first dummy sensing unit and a second dummy sensing unit that is different from the first dummy sensing unit.

According to some aspects, the first dummy sensing unit and the second dummy sensing unit are arranged to be spaced apart from each other based on the basic sensing unit.

According to some aspects, the basic sensing unit and the first and second dummy sensing units are in a cascade connection in order of the first dummy sensing unit, the basic sensing unit, and the second dummy sensing unit, and the performing, by the sensing unit, the sensing operation for external compensation of the display panel comprises in sequence performing, by the first dummy sensing unit, a sensing operation on changes in a gain and an offset of the ADC, and performing, by the basic sensing unit, the sensing operation on the driving TFT, and performing, by the second dummy sensing unit, a sensing operation on changes in a gain and an offset of the ADC.

According to still another aspect of the disclosure, a sensing unit configured to perform a sensing operation for external compensation of a display panel, comprises a basic sensing unit configured to perform a sensing operation on a driving TFT comprised in the display panel, and a dummy sensing unit configured to perform a sensing operation on changes in a gain and an offset of an ADC, wherein the basic sensing unit and the dummy sensing unit are in a cascade connection to each other, and input voltages of the basic sensing unit and the dummy sensing unit are different from each other.

The organic light-emitting display device and the method for driving the same of the present disclosure can compensate in real-time for changes in the gain and offset of an ADC due to changes in temperature and power supply voltage. Through this, the accuracy of the external compensation circuit can be improved.

Further, in the organic light-emitting display device and the method for driving the same of the present disclosure, any value can be used as the input voltage value required for the compensation of the gain and offset of the ADC independent of the input voltage of the SH circuit used for the compensation of the driving TFT.

In addition, the organic light-emitting display device and the method for driving the same of the present disclosure have the effect of reducing the total compensation operation time including the compensation operation for the driving TFT and the compensation operation on the changes in the gain and offset of the ADC.

In addition to the contents described above, specific effects of the present disclosure will be described together while describing the following specific details for carrying out the present disclosure.

DETAILED DESCRIPTION OF THE PREFERRED EMBODIMENTS

Figure 1:
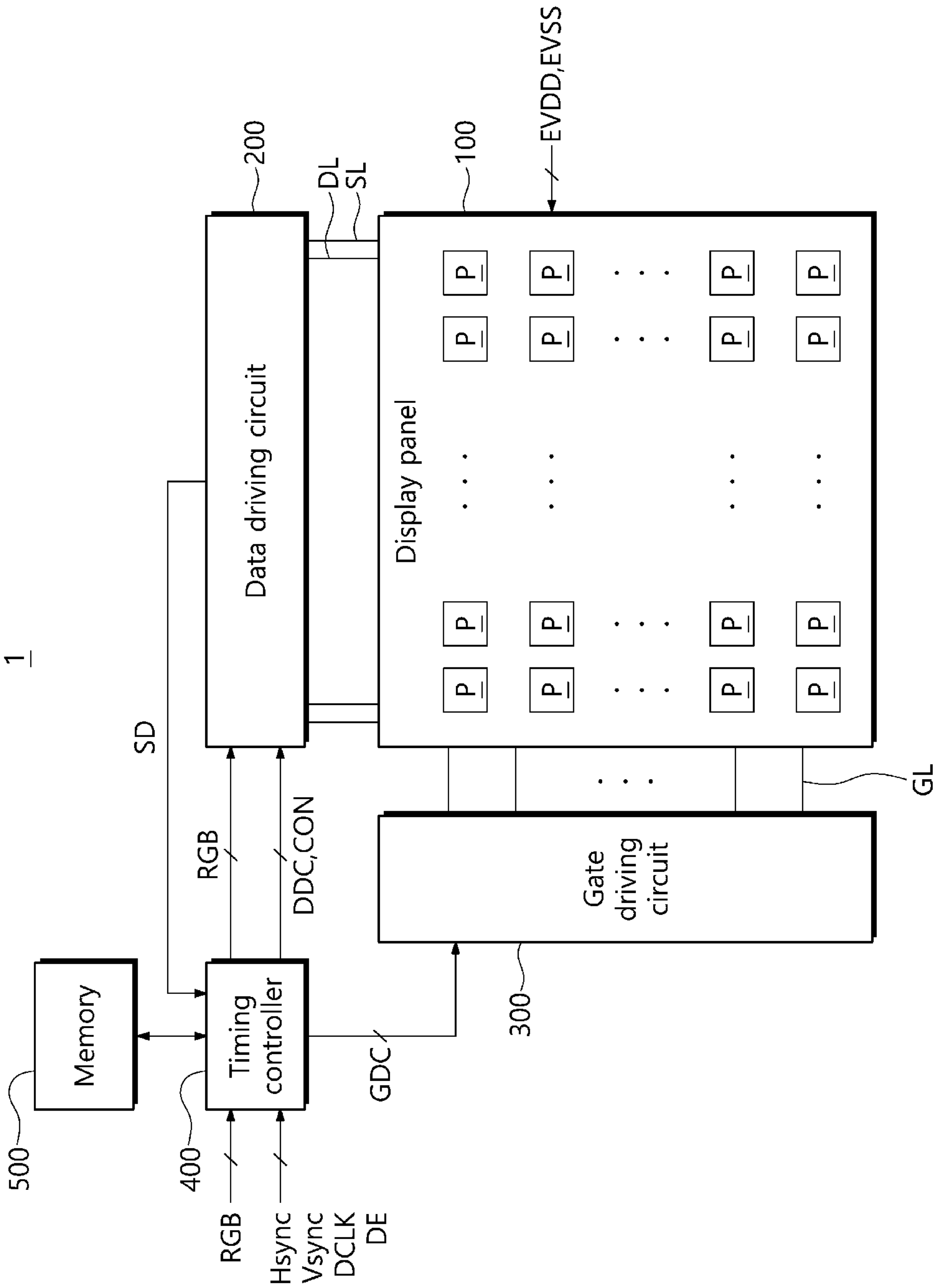
FIG. 1 illustrates an organic light-emitting display device in accordance with some embodiments of the present disclosure.

The terms or words used in the present description and the claims should not be construed as limited to their ordinary or lexical meanings. They should be construed as the meaning and concept in line with the technical idea of the present disclosure based on the principle that the inventor can define the concept of terms or words in order to describe his/her own invention in the best possible way. Further, since the embodiment described herein and the configurations illustrated in the drawings are merely example embodiments in which the present disclosure is realized and do not represent all the technical ideas of the present disclosure, it should be understood that there may be various equivalents, variations, and applicable examples that can replace them at the time of filing this application.

Although terms such as first, second, A, B, etc. used in the present description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the present disclosure. The term 'and/or' includes a combination of a plurality of related listed items or any item of the plurality of related listed items.

The terms used in the present description and the claims are merely used to describe particular embodiments and are not intended to limit the present disclosure. Singular expressions include plural expressions unless the context explicitly indicates otherwise. In the present application, terms such as “comprise,” “have,” etc. should be understood as not precluding the possibility of existence or addition of features, numbers, steps, operations, components, parts, or combinations thereof described herein.

Unless defined otherwise, all terms used herein, including technical or scientific terms, have the same meaning as commonly understood by those of ordinary skill in the art to which the present disclosure pertains.

Terms such as those defined in commonly used dictionaries should be construed as having a meaning consistent with the meaning in the context of the relevant art, and are not to be construed in an ideal or excessively formal sense unless explicitly defined in the present application. In addition, each configuration, procedure, process, method, or the like included in each embodiment of the present disclosure may be shared to the extent that they are not technically contradictory to each other.

In addition, the term “module” used herein refers to a software or hardware component, and a “module” performs certain roles. However, a “module” is not meant to be limited to software or hardware. A “module” may be configured to reside on an addressable storage medium, or may be configured to run one or more processors. Thus, as one example, a “module” includes components such as software components, object-oriented software components, class components, and task components, processes, functions, properties, procedures, subroutines, segments of program code, drivers, firmware, microcode, circuits, data, databases, data structures, tables, arrays, and variables. The functionality provided in the components and “modules” may be combined into fewer components and “modules” or further separated into additional components and “modules.”

Hereinafter, an organic light-emitting display device, a method for driving the same, and a sensing unit in accordance with an embodiment of the present disclosure will be described with reference to FIGS. 1 to 6.

Figure 2:
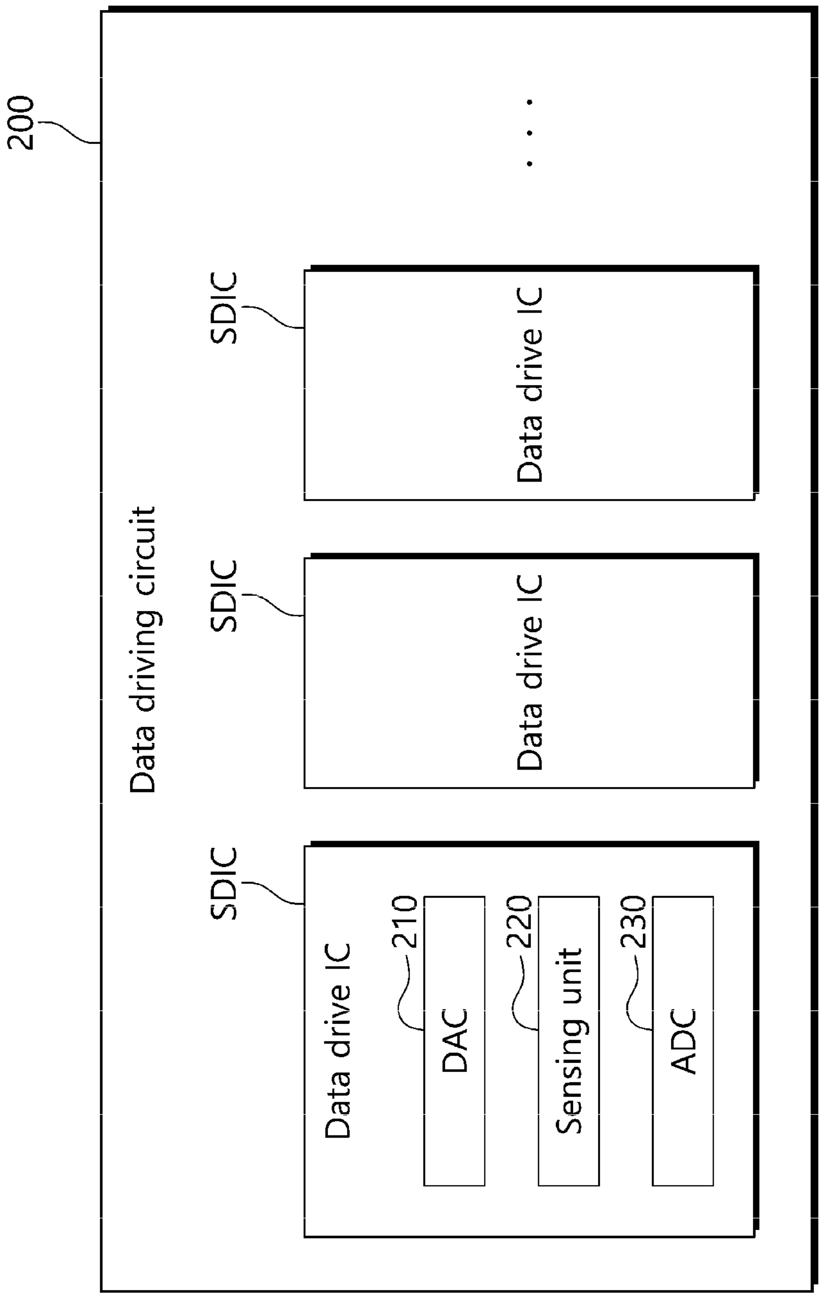
FIG. 2 is a block diagram of a data driving circuit in accordance with some embodiments of the present disclosure.

FIG. 1 illustrates an organic light-emitting display device in accordance with some embodiments of the present disclosure. FIG. 2 is a block diagram of a data driving circuit in accordance with some embodiments of the present disclosure;

Referring to FIGS. 1 and 2, an organic light-emitting display device 1 in accordance with some embodiments of the present disclosure may include a display panel 100, a data driving circuit 200, a gate driving circuit 300, a timing controller 400, and a memory 500.

The display panel 100 may include an organic light-emitting diode (OLED) panel in which OLEDs are formed. However, embodiments of the present disclosure are not limited thereto, and as a matter of course, the display panel 100 may include other various materials and configurations.

A plurality of pixels P may be formed in the display panel 100.

The plurality of pixels P included in the display panel 100 may be connected to a plurality of data lines DL, sensing lines SL, and gate lines GL. In other words, the plurality of data lines DL, sensing lines SL, and gate lines GL may intersect each other in the display panel 100, and the pixels P may be formed in a matrix form in each intersecting region included in the display panel 100.

Each pixel P may be connected to one of the data lines DL, one of the sensing lines SL, and one of the gate lines GL, respectively. In response to a gate pulse inputted via the gate line GL, each pixel P may be electrically connected to the data line DL, receive a data voltage as input from the data line DL, and output a sensing signal via the sensing line SL.

Each pixel P may be supplied with a high potential driving voltage EVDD and a low potential driving voltage EVSS from a power generator.

Each pixel P may include a light-emitting diode (LED), an organic light-emitting diode (OLED), a driving TFT, a first switching TFT, a second switching TFT, and/or a storage capacitor for external compensation. The amount of data current flowing from the high potential driving voltage EVDD to the low potential driving voltage EVSS can be adjusted using the driving TFT, and the light-emitting diode (LED) and/or the organic light-emitting diode (OLED) can emit light by the data current. The driving TFT, the first switching TFT, and the second switching TFT that constitute the pixel P may be implemented as p-type or n-type.

The data driving circuit 200 may include at least one or more data drive ICs (integrated circuits) SDIC.

The data driving circuit 200 may include a plurality of data drive ICs SDIC as shown in FIG. 2. Although the number of data drive ICs SDIC is shown as three in the data driving circuit 200 of FIG. 2, this is merely for the convenience of description, and as a matter of course, embodiments of the present disclosure are not limited thereto.

The data drive IC SDIC may include a digital-to-analog converter 210 (hereinafter referred to as “DAC”), a sensing unit 220, and an analog-to-digital converter 230 (hereinafter referred to as “ADC”). In this case, the DAC 210 may be connected to each data line DL, the sensing unit 220 may be connected to each sensing line SL, and the ADC 230 may be commonly connected to the output terminals of the sensing units 220.

The DAC 210 may generate data according to a predetermined driving method and then supply the generated data to the data lines DL. At this time, the DAC 210 may operate in a driving mode and a sensing mode according to the mode control of the timing controller 400.

As some examples, the DAC 210 may convert digital video data RGB into data voltages for image implementation according to a data control signal DDC applied from the timing controller 400 during normal-type driving (driving mode) and supply the data voltages to the data lines DL. Alternatively, the DAC 210 may generate a data voltage for sensing according to the data control signal DDC applied from the timing controller 400 during sensing-type driving (sensing mode) and supply the data voltage to the data lines DL.

The sensing unit 220 may perform a sensing operation for external compensation of the display panel 100.

As some examples, the sensing unit 220 may perform sensing operations for the driving TFT included in the display panel 100 and/or the ADC 230 included in the data drive IC SDIC.

As one example, the sensing unit 220 may perform a sensing operation on the driving TFT included in the display panel 100.

As another example, the sensing unit 220 may perform a sensing operation on the ADC 230 included in the data drive IC SDIC.

As yet another example, the sensing unit 220 may perform sensing operations for the driving TFT included in the display panel 100 and the ADC 230 included in the data drive IC SDIC. At this time, the sensing unit 220 may perform sensing operations for the driving TFT and the ADC 230 at the same time within a predetermined time period. For example, the sensing unit 220 may perform sampling for the driving TFT and sampling for the ADC 230 together during the TSPL time (sampling time).

The sensing unit 220 may include an IV converter that receives and converts current into voltage, at least one or more sampling and hold (SH) circuits, and the like.

The IV converter may be referred to by the term integrator or current integrator. The IV converter may integrate the sensing signal of the pixel P inputted via the sensing line SL, i.e., the source-drain current of the driving TFT.

The SH circuit may sample and hold the output of the integrator. At this time, the SH circuit may perform the sampling operation during the TSPL time (sampling time) as described above.

Meanwhile, the sensing unit 220 may include a plurality of sub-sensing units, and each sub-sensing unit may perform a sensing operation on the driving TFT and a sensing operation on the ADC 230, respectively. In other words, some of the respective sub-sensing units included in the sensing unit 220 may perform a sensing operation on the driving TFT, and some others may perform a sensing operation on the ADC 230.

At this time, the respective sub-sensing units included in the sensing unit 220 may be arranged alternately according to a sensing target to be sensed. That is, a sub-sensing unit having the ADC as a sensing target out of the sub-sensing units included in the sensing unit 220, and a sub-sensing unit having the driving TFT as a sensing target out of the sub-sensing units included in the sensing unit 220 may be arranged to intersect each other.

A detailed description thereof will be given later.

The ADC 230 may digitally process the outputs of the sensing unit 220 in sequence. In other words, the ADC 230 may perform a conversion operation of converting an analog value held in the sensing unit 220 to a digital value.

As some examples, the ADC 230 may perform a conversion operation on the sensing results of the driving TFT together with a conversion operation on the sensing results of the gain and offset of the ADC.

For example, the ADC 230 may perform continuously or sequentially a conversion operation on the sensing operation on the driving TFT and a conversion operation on the sensing operation corresponding to the gain and offset of the ADC within a predetermined time period. At this time, the time period may include time intervals between a plurality of TSPL times.

The ADC 230 may digitally process the outputs of the sensing unit 220 in sequence and transfer them to the timing controller 400.

The gate driving circuit 300 may generate a gate pulse according to a predetermined driving method and then supply the generated gate pulse to the gate line GL. At this time, the gate driving circuit 300 may operate in a driving mode and a sensing mode according to the mode control of the timing controller 400.

Figure 4:
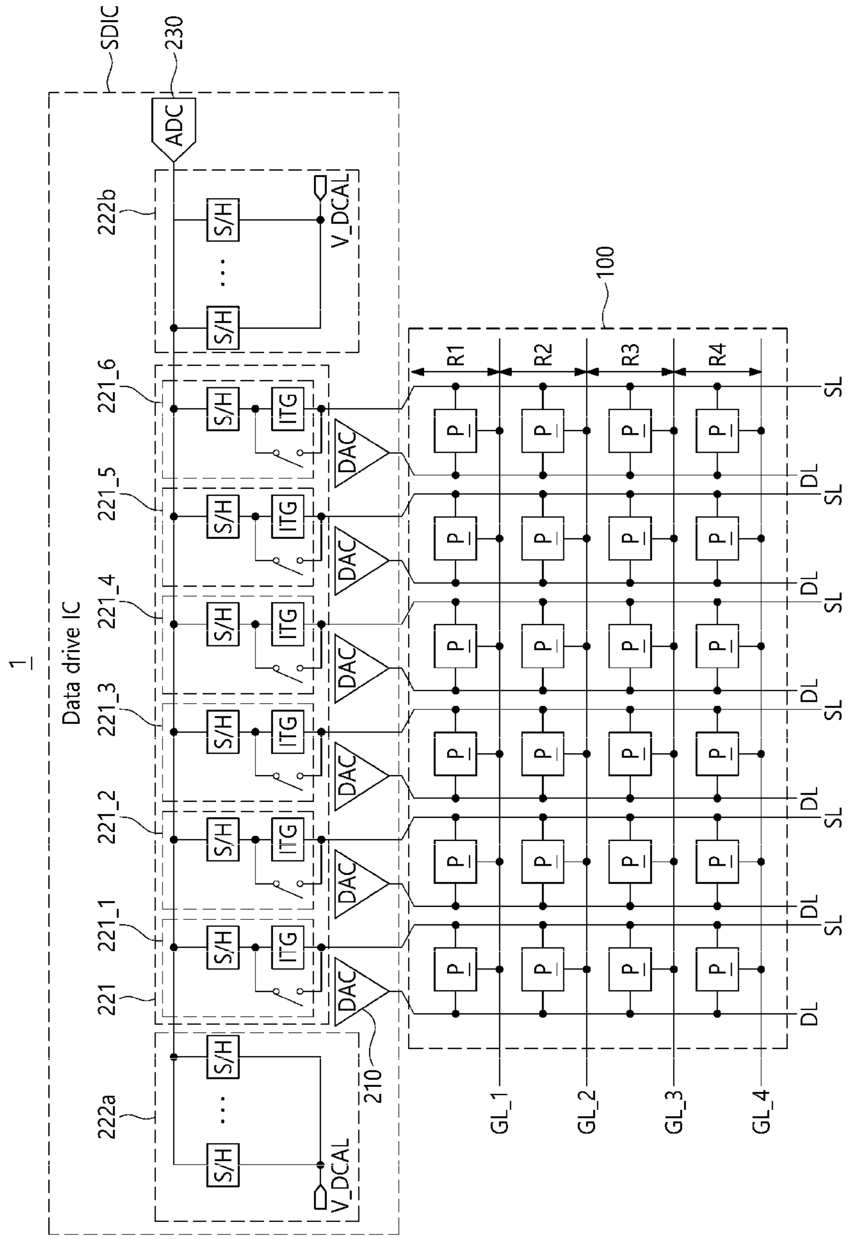
FIG. 4 is a circuit diagram of an organic light-emitting display device in accordance with some embodiments of the present disclosure.

As some examples, the gate driving circuit 300 may generate gate pulses for image display based on gate control signals GDC during normal-type driving (driving mode), and then supply them in sequence to the gate lines (GL_1, GL_2, GL_3, GL_4 in FIG. 4) in a row-sequential manner (R1, R2, R3, R4 in FIG. 4). Alternatively, the gate driving circuit 300 may generate gate pulses for sensing based on gate control signals GDC during sensing-type driving (sensing mode), and then supply them in sequence to the gate lines (GL_1, GL_2, GL_3, GL_4 in FIG. 4) in a row-sequential manner (R1, R2, R3, R4 in FIG. 4).

The timing controller 400 may control operations of the data driving circuit 200 and the gate driving circuit 300.

As some examples, the timing controller 400 may operate the data driving circuit 200 and the gate driving circuit 300 in a driving mode or a sensing mode.

As one example, the timing controller 400 may display an image by operating the data driving circuit 200 and the gate driving circuit 300 in the driving mode.

As another example, the timing controller 400 may cause a change in the characteristics of the driving TFT formed in each pixel to be sensed by operating the data driving circuit 200 and the gate driving circuit 300 in the sensing mode. At this time, the timing controller 400 may generate a data control signal DDC for controlling the operation timing of the data driving circuit 200 and a gate control signal GDC for controlling the operation timing of the gate driving circuit 300 based on timing synchronization signals. In this case, the timing synchronization signals may include a vertical synchronization signal Vsync, a horizontal synchronization signal Hsync, a dot clock signal DCLK, a data enable signal DE, and the like, but embodiments of the present disclosure are not limited thereto.

The timing controller 400 may distinguish between the driving mode (normal driving) and the sensing mode (sensing driving) based on a predetermined reference signal or the like, and may generate a data control signal DDC and a gate control signal GDC according to each mode. In this case, the reference signal may include a driving power enable signal, a vertical synchronization signal Vsync, a data enable signal DE, and the like.

Meanwhile, the timing controller 400 may generate an additional control signal necessary for the sensing driving. At this time, the additional control signal may include an RST signal, a sampling signal SAM and a holding signal HOLD for the SH circuit, and the like.

When controlling in the driving mode, the timing controller 400 may modulate digital video data RGB for implementing an image with reference to compensation data stored in the memory 500 and then transmit them to the data driving circuit 200.

When controlling in the sensing mode, the timing controller 400 may transmit digital data corresponding to the data voltage for sensing to the data driving circuit 200. The timing controller 400 may generate compensation data by applying a digital sensing value SD transmitted from the ADC 230 of the data driving circuit 200 to a compensation algorithm stored in advance during the sensing driving, and then store them in the memory 500.

In this case, the compensation data may include a combination result of first compensation data for compensating for the characteristic of each pixel P and second compensation data for compensating for the characteristic of the ADC 230. The first compensation data may be compensation data for compensating for a threshold voltage Vth deviation and a mobility k deviation of each pixel P, and the second compensation data may be compensation data for compensating for changes in the gain and offset of the ADC 230.

Figure 3:
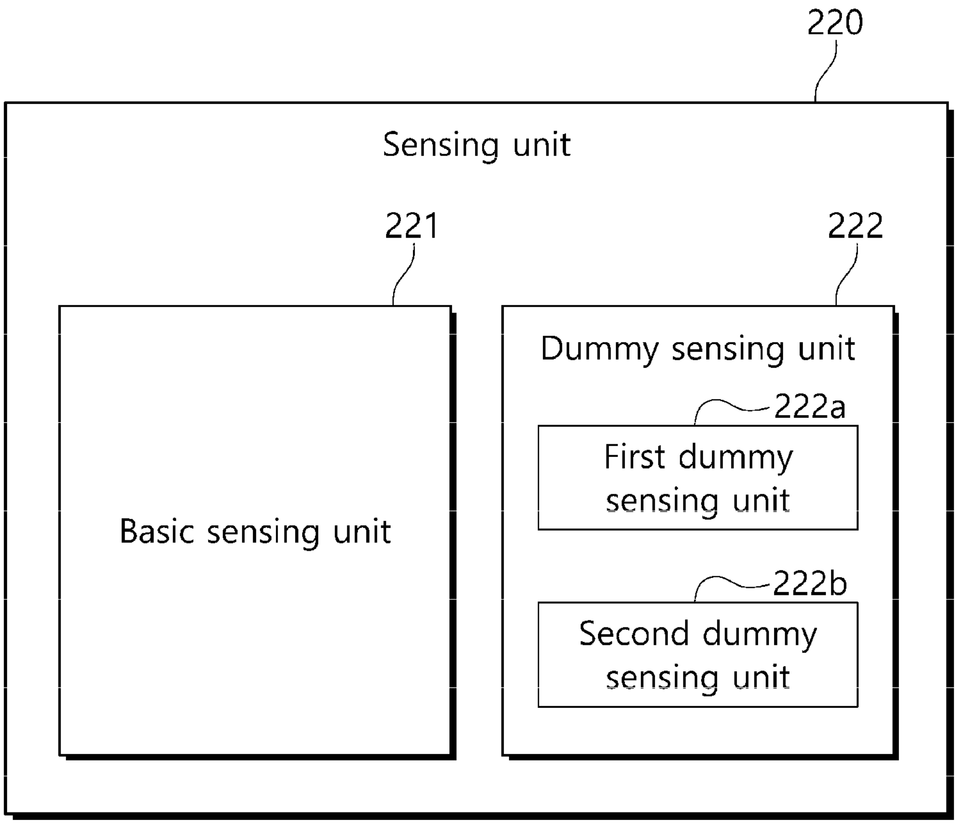
FIG. 3 is a detailed block diagram of a sensing unit in accordance with some embodiments of the present disclosure.

FIG. 3 is a detailed block diagram of a sensing unit in accordance with some embodiments of the present disclosure.

Referring to FIG. 3, the sensing unit 220 may include a basic sensing unit 221 and a dummy sensing unit 222. The dummy sensing unit 222 may include a plurality of sub-dummy sensing units. In other words, the dummy sensing unit 222 may include a first dummy sensing unit 222*a* and a second dummy sensing unit 222*b*.

Although the dummy sensing unit 222 is shown in FIG. 3 as including only the first dummy sensing unit 222*a* and the second dummy sensing unit 222*b*, embodiments of the present disclosure are not limited thereto, and the number of sub-dummy sensing units included in the dummy sensing unit 222 may be freely modified. In other words, the dummy sensing unit 222 may include only one sub-dummy sensing unit or may include three or more sub-dummy sensing units.

As described above, the sensing unit 220 may perform a sensing operation for external compensation of the display panel 100. As some examples, the sensing unit 220 may perform sensing operations for the driving TFT included in the display panel (100 in FIG. 1) and/or the ADC included in the data drive IC SDIC.

For example, the basic sensing unit 221 may perform a sensing operation on the driving TFT, and the dummy sensing unit 222 may perform a sensing operation on changes in the gain and offset of the ADC. In other words, the basic sensing unit 221 may perform a sensing operation on the driving TFT included in each pixel (P in FIG. 1) formed on the display panel (100 in FIG. 1), and the first dummy sensing unit 222*a* and the second dummy sensing unit 222*b* may perform sensing operations for changes in the gain and offset of the ADC (230 of FIG. 2).

The basic sensing unit 221 and the dummy sensing unit 222 may each include at least one or more sampling and hold (SH) circuits. The SH circuits included in the basic sensing unit 221 and the dummy sensing unit 222, respectively, may perform a sampling operation during the TSPL time (sampling time) and then perform a holding operation. In this case, the number of SH circuits included in the first dummy sensing unit 222*a* and the second dummy sensing unit 222*b*, i.e., the number of channels, may be the same as each other. However, embodiments of the present disclosure are not limited thereto, and the number of SH circuits included in the first dummy sensing unit 222*a* and the second dummy sensing unit 222*b* may also be different from each other.

The basic sensing unit 221 may further include an IV converter that receives and changes current into voltage. The IV converter may be referred to by the term integrator or current integrator. The IV converter may integrate the sensing signal of the pixel (P in FIG. 1) inputted via the sensing line (SL in FIG. 1), i.e., the source-drain current of the driving TFT. However, the IV converter may be omitted from the basic sensing unit 221.

Input voltages to the basic sensing unit 221 and the dummy sensing unit 222 may be different from each other. In other words, the basic sensing unit 221 and the dummy sensing unit 222 may have different input voltage values.

For example, the input voltage of the basic sensing unit 221 may be a value that changes according to the threshold voltage and mobility of the driving TFT, and the input voltage of the dummy sensing unit 222 may be a predetermined value in relation to the gain and offset of the ADC. However, embodiments of the present disclosure are not limited thereto.

Meanwhile, the basic sensing unit 221 and the dummy sensing unit 222 may be in a cascade connection to each other.

In this case, the basic sensing unit 221 and the dummy sensing unit 222 may be arranged alternately with each other. In other words, the basic sensing unit 221 and the dummy sensing unit 222 may be arranged to intersect each other.

As some examples, the first dummy sensing unit 222*a* and the second dummy sensing unit 222*b* may be arranged to be spaced apart from each other based on the basic sensing unit 221. In other words, the respective sub-sensing units included in the sensing unit 220 may be in a cascade connection in order of the first dummy sensing unit 222*a*, the basic sensing unit 221, and the second dummy sensing unit 222*b*. However, embodiments of the present disclosure are not limited thereto.

FIG. 4 is a circuit diagram of an organic light-emitting display device in accordance with some embodiments of the present disclosure.

Referring to FIG. 4, the organic light-emitting display device 1 may include the display panel 100 and the data drive IC SDIC connected to the display panel 100 and included in the data driving circuit 200, as described above.

A plurality of pixels P may be formed in the display panel 100.

The plurality of pixels P included in the display panel 100 may be connected to a plurality of data lines DL, sensing lines SL, and gate lines GL_1 to GL_4. In other words, the plurality of data lines DL, sensing lines SL, and gate lines GL_1 to GL_4 may intersect each other in the display panel 100, and pixels P may be arranged in a matrix form in each intersecting region included in the display panel 100. Each pixel P may be connected to one of the data lines DL, one of the sensing lines SL, and one of the gate lines GL_1 to GL_4, respectively. In response to gate pulses inputted via the gate lines GL_1 to GL_4, each pixel P may be electrically connected to the data line DL, receive a data voltage as input from the data line DL, and output a sensing signal via the sensing line SL.

Each pixel P may include a light-emitting diode (LED), an organic light-emitting diode (OLED), a driving TFT, a first switching TFT, a second switching TFT, and/or a storage capacitor for external compensation. The amount of data current flowing from the high potential driving voltage EVDD to the low potential driving voltage EVSS can be adjusted using the driving TFT, and the light-emitting diode (LED) and/or the organic light-emitting diode (OLED) can emit light by the data current. The driving TFT, the first switching TFT, and the second switching TFT that constitute the pixel P may be implemented as p-type or n-type.

The data drive IC SDIC may include a DAC 210, a basic sensing unit 221, a first dummy sensing unit 222*a*, a second dummy sensing unit 222*b*, and an ADC 230.

At this time, the DAC 210 may be connected to each data line DL, the basic sensing unit 221 may be connected to each sensing line SL, and the ADC 230 may be commonly connected to the output terminals of the basic sensing unit 221 and the dummy sensing units 222*a* and 222*b*, as shown in FIG. 4.

The DAC 210 may generate data according to a predetermined driving method and then supply the generated data to the data lines DL. At this time, the DAC 210 may operate in a driving mode and a sensing mode according to the mode control of the timing controller (400 in FIG. 1).

As some examples, the DAC 210 may convert digital video data RGB into data voltages for image implementation according to a data control signal DDC applied from the timing controller (400 in FIG. 1) during normal-type driving (driving mode) and supply the data voltages to the data lines DL. Alternatively, the DAC 210 may generate a data voltage for sensing according to the data control signal DDC applied from the timing controller (400 in FIG. 1) during sensing-type driving (sensing mode) and supply the data voltage to the data lines DL.

The basic sensing unit 221 may perform a sensing operation on the driving TFT included in the display panel 100. The basic sensing unit 221 may perform a sensing operation on the driving TFT according to the sensing mode control of the timing controller (400 in FIG. 1).

The basic sensing unit 221 may include a plurality of channels 221_1 to 221_6. Although the basic sensing unit 221 is shown in FIG. 4 as including first to sixth channels 221_1 to 221_6, this is merely for the convenience of description, and the number of channels included in the basic sensing unit 221 is not limited thereto.

Each of the first to sixth channels 221_1 to 221_6 may include an IV converter (integrator, ITG) and an SH circuit S/H.

The IV converter ITG may integrate the sensing signal of the pixel P inputted via the sensing line SL, i.e., the source-drain current of the driving TFT. The IV converter ITG may include an amplifier, an integrator capacitor, a switch connected to both ends of the integrator capacitor, and the like. At this time, the amplifier may include an inverting input terminal (−) that is connected to the sensing line SL and receives as input the source-drain current of the driving TFT from the sensing line SL, a non-inverting input terminal (+) that receives a reference voltage as input, an output terminal that outputs an integral value, and the like.

The current integration result of the IV converter ITG may be transferred to the SH circuit S/H.

The SH circuit S/H may perform a sampling operation during the TSPL time (sampling time) for the current integration result and then hold it. The SH circuit S/H may include a first switch that is switched according to a sampling signal SAM provided from the timing controller (400 in FIG. 1), a second switch that is switched according to a holding signal HOLD provided from the timing controller (400 in FIG. 1), a holding capacitor, and the like. In this case, one end of the holding capacitor may be connected between the first switch and the second switch, and the other end of the holding capacitor may be connected to a base voltage source.

The input voltage of the basic sensing unit 221 may be a value that changes according to the threshold voltage and mobility of the driving TFT.

That is, the input voltage of each of the first to sixth channels 221_1 to 221_6 may be the threshold voltage Vth and mobility k of the driving TFT corresponding to each channel. In other words, the input voltage of each of the first to sixth channels 221_1 to 221_6 may be different from each other depending on the threshold voltage Vth and mobility k of the driving TFT corresponding to each of the channels 221_1 to 221_6.

The dummy sensing unit 222 may perform a sensing operation on the ADC 230. The dummy sensing unit 222 may perform a sensing operation on the ADC 230 according to the sensing mode control of the timing controller (400 in FIG. 1).

As shown in FIG. 4, the dummy sensing unit 222 may include a first dummy sensing unit **222*a* and a second dummy sensing unit 222*b*. Although the dummy sensing unit 222 is shown in FIG. 4 as including only the first dummy sensing unit 222*a* and the second dummy sensing unit 222*b*, embodiments of the present disclosure are not limited thereto, and the number of sub-dummy sensing units included in the dummy sensing unit 222 may be freely modified. In other words, the dummy sensing unit 222** may include only one sub-dummy sensing unit or may include three or more sub-dummy sensing units.

As some examples, the first dummy sensing unit **222*a* and the second dummy sensing unit 222*b* may perform sensing operations for changes in the gain and offset of the ADC 230**.

The first dummy sensing unit **222*a* and the second dummy sensing unit 222*b* may include an SH circuit S/H. In this case, the number of SH circuits S/H included in the first dummy sensing unit 222*a* and the second dummy sensing unit 222*b* may be the same as each other. However, embodiments of the present disclosure are not limited thereto, and the number of SH circuits S/H included in the first dummy sensing unit 222*a* and the second dummy sensing unit 222*b*** may be different from each other.

The SH circuits S/H included in the first dummy sensing unit **222*a* and the second dummy sensing unit 222*b*** may perform sampling operations during the TSPL time for the input voltage V_DCAL, and then hold it.

The input voltages V_DCAL to the first dummy sensing unit **222*a* and the second dummy sensing unit 222*b* may be predetermined values in relation to the gain and offset of the ADC 230. For example, the input voltages V_DCAL to the first dummy sensing unit 222*a* and the second dummy sensing unit 222*b* may be determined in advance within a voltage range that can be accepted by the basic sensing unit 221. For example, the input voltages V_DCAL to the first dummy sensing unit 222*a* and the second dummy sensing unit 222*b*** may be approximately in the range of 2V to 6V or in the range of 7V to 11V, but as a matter of course, embodiments of the present disclosure are not limited thereto.

The first dummy sensing unit **222*a* and the second dummy sensing unit 222*b* may be arranged to be spaced apart from each other based on the basic sensing unit 221. In other words, the respective sub-sensing units included in the sensing unit 220 may be in a cascade connection in order of the first dummy sensing unit 222*a*, the basic sensing unit 221, and the second dummy sensing unit 222*b***. However, embodiments of the present disclosure are not limited thereto.

As such, by arranging the first dummy sensing unit **222*a* and the second dummy sensing unit 222*b* to be spaced apart, there is an effect of being able to further compensate for code differences between the respective channels included in the basic sensing unit 221**.

That is, since the data drive IC (SDIC in FIGS. 2 and 4) actually has a length that is not short, code differences in the SH circuits (e.g., the SH circuit of 221_1 and the SH circuit of 221_6) of the channels on both sides of the basic sensing unit 221 may occur. Therefore, in the case of the organic light-emitting display device (1 in FIG. 1) of the present disclosure, by connecting the respective dummy sensing units **222*a* and 222*b* so as to be adjacent to the SH circuits (e.g., the SH circuit of 221_1 and the SH circuit of 221_6) of the channels on both sides of the basic sensing unit 221, there will be a novel effect of being able to reflect code differences in each channel included in the basic sensing unit 221**.

The ADC 230 may digitally process the outputs of the basic sensing unit 221 and the dummy sensing unit 222. In other words, the ADC 230 may perform a conversion operation of converting analog values held in the basic sensing unit 221 and the dummy sensing unit 222 into digital values.

As some examples, the ADC 230 may digitally process the outputs of the basic sensing unit 221 and the dummy sensing unit 222 in sequence. In this case, the ADC 230 may digitally process the outputs of the basic sensing unit 221 and the dummy sensing unit 222 in sequence according to the arrangement form or connection form of the basic sensing unit 221 and the dummy sensing unit 222.

In other words, the ADC 230 may perform continuous digital processing in the order of the value held in the first dummy sensing unit **222*a*, the value held in the basic sensing unit 221, and the value held in the second dummy sensing unit 222***b*. At this time, the ADC 230 may perform the continuous digital processing during the time intervals between the plurality of TSPL times.

The ADC 230 may transfer the digital processing result to the timing controller (400 in FIG. 1).

Figure 5A:
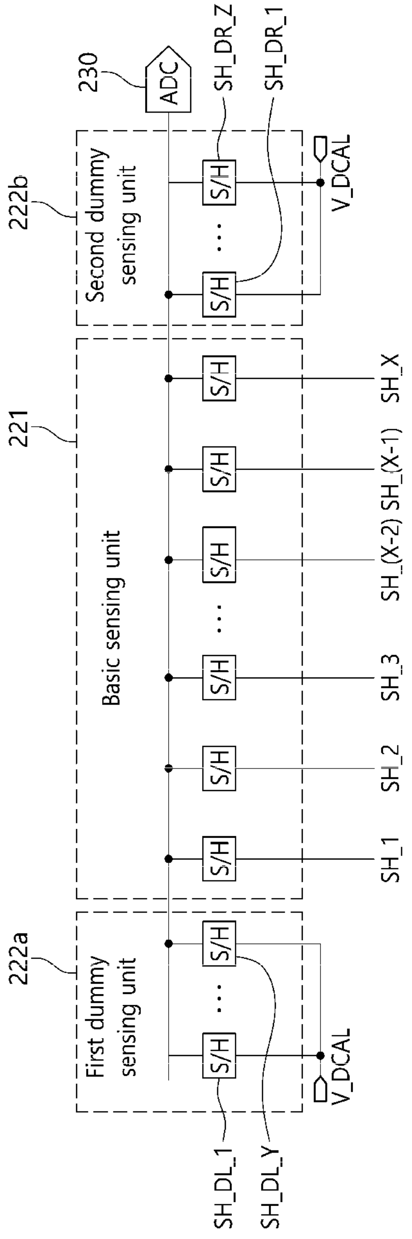
FIGS. 5A and 5B are conceptual diagrams for describing an external compensation process using a sensing unit and an ADC in accordance with some embodiments of the present disclosure.
Figure 5B:
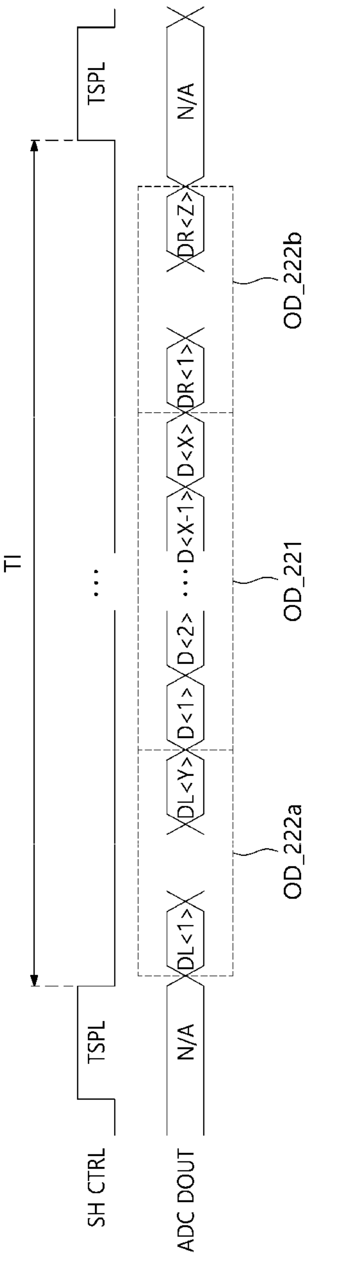

FIGS. 5A and 5B are conceptual diagrams for describing an external compensation process using a sensing unit and an ADC in accordance with some embodiments of the present disclosure.

Specifically, FIG. 5A is a circuit diagram schematically illustrating a basic sensing unit 221, a first dummy sensing unit 222*a*, and a second dummy sensing unit 222*b*, and FIG. 5B shows an external compensation data processing flow in the circuit configuration of FIG. 5A, i.e., a data processing (sampling) flow SH CTRL of the basic sensing unit 221, the first dummy sensing unit 222*a*, and the second dummy sensing unit 222*b*, and a digital processing flow ADC DOUT, which is the code output result of the ADC 230.

FIG. 5A shows that the number of channels included in the basic sensing unit 221 is X, the number of SH circuits S/H included in the first dummy sensing unit 222*a* is Y, and the number of SH circuits S/H included in the second dummy sensing unit 222*b* is Z.

In this case, the number of channels included in the basic sensing unit 221, i.e., the X value may be approximately 161, but embodiments of the present disclosure are not limited thereto. Further, Y and Z may have the same value or different values from each other, as described above.

FIG. 5B shows a result OD_222*a* obtained by digitally processing the output of the first dummy sensing unit 222*a* by the ADC 230, a result OD_221 obtained by digitally processing the output of the basic sensing unit 221 by the ADC 230, and a result OD_222*b* obtained by digitally processing the output of the second dummy sensing unit 222*b* by the ADC 230.

Referring to FIGS. 5A and 5B, each SH circuit S/H included in the basic sensing unit 221, the first dummy sensing unit 222*a*, and the second dummy sensing unit 222*b* may perform a sampling operation during the TSPL time (sampling time). In other words, each SH circuit S/H included in the basic sensing unit 221, each SH circuit S/H included in the first dummy sensing unit 222*a*, and each SH circuit S/H included in the second dummy sensing unit 222*b* may perform a sampling operation during the TSPL time.

At this time, the input voltages of the basic sensing unit 221, the first dummy sensing unit 222*a*, and the second dummy sensing unit 222*b* may be different from each other, as described above. The input voltage of the basic sensing unit 221 may be a value that changes according to the threshold voltage and mobility of the driving TFT included in the pixel (P in FIG. 1) formed on the display panel (100 in FIG. 1), and the input voltages of the first dummy sensing unit 222*a* and the second dummy sensing unit 222*b* may be predetermined values in relation to the gain and offset of the ADC 230.

Next, each SH circuit S/H included in the basic sensing unit 221, the first dummy sensing unit 222*a*, and the second dummy sensing unit 222*b* may hold the sampling results.

Next, the ADC 230 may digitally process the outputs of the basic sensing unit 221 and the dummy sensing unit 222 in sequence for a predetermined time interval. In other words, the ADC 230 may perform a conversion operation of converting the analog values held in the basic sensing unit 221 and the dummy sensing unit 222 into digital values.

In this case, the predetermined time interval may include a time interval TI between a plurality of TSPL times.

As some examples, the ADC 230 may digitally process the outputs of the basic sensing unit 221 and the dummy sensing unit 222 in sequence. In this case, the ADC 230 may digitally process the outputs of the basic sensing unit 221 and the dummy sensing unit 222 in sequence according to the arrangement form or connection form of the basic sensing unit 221 and the dummy sensing unit 222.

For example, the ADC 230 may first digitally process the value held in the first dummy sensing unit 222*a* and output the digital processing result OD_222*a*, may then digitally process the value held in the basic sensing unit 221 and output the digital processing result OD_221, and may then digitally process the value held in the second dummy sensing unit 222*b* and output the digital processing result OD_222*b*.

Figure 6:
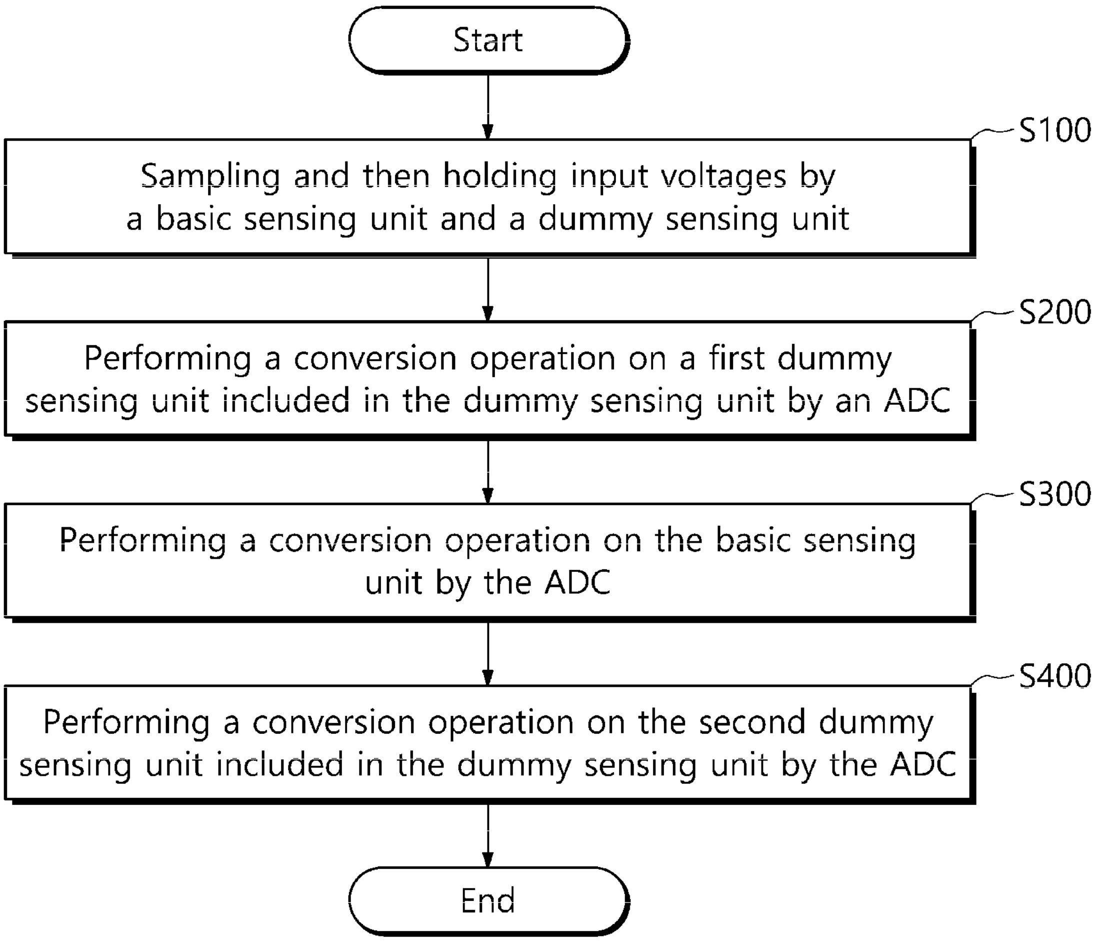
FIG. 6 is a flowchart of a method for driving an organic light-emitting display device in accordance with some embodiments of the present disclosure.

FIG. 6 is a flowchart of a method for driving an organic light-emitting display device in accordance with some embodiments of the present disclosure. The respective steps S100 to S400 of FIG. 6 may be performed by the organic light-emitting display device 1 of FIGS. 1 and 4. In the following, a brief description will be given, omitting overlapping descriptions.

Referring to FIGS. 1, 4, and 6, first, the basic sensing unit 221 and the dummy sensing unit 222 may sample and then hold input voltages (S100).

As some examples, the dummy sensing unit 222 may include a first dummy sensing unit 222*a* and a second dummy sensing unit 222*b* that are in a cascade connection to the basic sensing unit 221. In other words, the sensing units 220 included in the organic light-emitting display device 1 may be in a cascade connection in order of the first dummy sensing unit 222*a*, the basic sensing unit 221, and the second dummy sensing unit 222*b*.

In this case, the input voltages of the basic sensing unit 221 and the dummy sensing unit 222 may be different from each other. For example, the input voltage of the basic sensing unit 221 may be a value that changes according to the threshold voltage and mobility of the driving TFT, and the input voltage of the dummy sensing unit 222 may be a predetermined value in relation to the gain and offset of the ADC 230. However, embodiments of the present disclosure are not limited thereto. A detailed description thereof will be omitted.

Next, the ADC 230 may perform a conversion operation on the first dummy sensing unit 222*a* included in the dummy sensing unit 222 (S200). In other words, the ADC 230 may perform a conversion operation of converting the analog value held in the first dummy sensing unit 222*a* into a digital value.

Next, the ADC 230 may perform a conversion operation on the basic sensing unit 221 (S300). In other words, the ADC 230 may perform a conversion operation of converting the analog value held in the basic sensing unit 221 into a digital value.

Next, the ADC 230 may perform a conversion operation on the second dummy sensing unit 222*b* included in the dummy sensing unit 222 (S400). In other words, the ADC 230 may perform a conversion operation of converting the analog value held in the second dummy sensing unit 222*b* into a digital value.

Next, the ADC 230 may transfer the results of the conversion operation to the timing controller 400.

Next, compensation data may be generated by applying the digital sensing value SD transmitted from the ADC 230 to a compensation algorithm stored in advance, and may then be stored in the memory 500.

In this case, the compensation data may include a combination result of first compensation data for compensating for the characteristic of each pixel P and second compensation data for compensating for the characteristic of the ADC 230. The first compensation data may be compensation data for compensating for a threshold voltage Vth deviation and a mobility k deviation of each pixel P, and the second compensation data may be compensation data for compensating for changes in the gain and offset of the ADC 230.

Next, compensation driving for the pixel P may be performed using the updated compensation data.

The above description is merely an illustrative description of the technical idea of the present embodiments, and those of ordinary skill in the art to which the present embodiments pertain will be able to make various modifications and variations without departing from the essential characteristics of the embodiments. Therefore, the present embodiments are not intended to limit the technical idea of the present embodiments but to describe it, and the scope of the technical idea of the present embodiments is not limited by these embodiments. The scope of protection of the present embodiments should be construed by the accompanying claims, and all technical ideas within the scope equivalent thereto should be construed as being included in the scope of the present embodiments.

What is claimed is:

1. An organic light-emitting display device including a display panel including a driving thin film transistor (TFT), comprising:

a sensing unit configured to perform a sensing operation for external compensation of the display panel; and an analog-digital converter (ADC) configured to perform a conversion operation of converting an analog value held in the sensing unit into a digital value, wherein the sensing unit comprises:

a basic sensing unit configured to perform a sensing operation on the driving TFT; and a dummy sensing unit configured to perform a sensing operation on changes in a gain and an offset of the ADC, and the basic sensing unit and the dummy sensing unit are in a cascade connection to each other.

2. The organic light-emitting display device of claim 1, wherein the basic sensing unit and the dummy sensing unit each comprises at least one or more sampling and hold (SH) circuits, and the SH circuit comprised in the basic sensing unit and the SH circuit comprised in the dummy sensing unit perform a sampling operation during a TSPL time (sampling time).

3. The organic light-emitting display device of claim 2, wherein the ADC performs the conversion operation corresponding to the basic sensing unit and the conversion operation corresponding to the dummy sensing unit in sequence within a predetermined time period.

4. The organic light-emitting display device of claim 3, wherein the time period comprises time intervals between a plurality of TSPL times.

5. The organic light-emitting display device of claim 1, wherein input voltages of the basic sensing unit and the dummy sensing unit are different from each other.

6. The organic light-emitting display device of claim 5, wherein the input voltage of the basic sensing unit is a value that changes according to a threshold voltage and mobility of the driving TFT, and the input voltage of the dummy sensing unit is a predetermined value in relation to the gain and the offset of the ADC.

7. The organic light-emitting display device of claim 1, wherein the dummy sensing unit comprises a first dummy sensing unit and a second dummy sensing unit that is different from the first dummy sensing unit.

8. The organic light-emitting display device of claim 7, wherein the first dummy sensing unit and the second dummy sensing unit are arranged to be spaced apart from each other based on the basic sensing unit.

9. The organic light-emitting display device of claim 8, wherein the basic sensing unit and the first and second dummy sensing units are in a cascade connection in order of the first dummy sensing unit, the basic sensing unit, and the second dummy sensing unit.

10. The organic light-emitting display device of claim 7, wherein the numbers of SH circuits comprised in the first dummy sensing unit and the second dummy sensing unit are equal to each other.

11. A method for driving an organic light-emitting display device including a display panel including a driving thin film transistor (TFT), the method comprising:

performing, by a sensing unit, a sensing operation for external compensation of the display panel; and performing, by an ADC, a conversion operation of converting an analog value held in the sensing unit into a digital value, wherein the performing the sensing operation comprises:

performing, by a basic sensing unit comprised in the sensing unit, a sensing operation on the driving TFT; and performing, by a dummy sensing unit comprised in the sensing unit, a sensing operation on changes in a gain and an offset of the ADC, and the basic sensing unit and the dummy sensing unit are in a cascade connection to each other.

12. The method for driving an organic light-emitting display device of claim 11, wherein the basic sensing unit and the dummy sensing unit each comprises at least one or more sampling and hold (SH) circuits, and the performing, by the basic sensing unit, the sensing operation on the driving TFT comprises performing, by the SH circuit comprised in the basic sensing unit, a sampling operation during a TSPL time, and the performing, by the dummy sensing unit, the sensing operation on the changes in the gain and the offset of the ADC comprises performing, by the SH circuit comprised in the dummy sensing unit, a sampling operation during the TSPL time.

13. The method for driving an organic light-emitting display device of claim 12, wherein the performing the conversion operation comprises sequentially performing, by the ADC, the conversion operation on the basic sensing unit and the conversion operation on the dummy sensing unit within a predetermined time period.

14. The method for driving an organic light-emitting display device of claim 13, wherein the time period comprises time intervals between a plurality of TSPL times.

15. The method for driving an organic light-emitting display device of claim 11, wherein input voltages of the basic sensing unit and the dummy sensing unit are different from each other.

16. The method for driving an organic light-emitting display device of claim 15, wherein the input voltage of the basic sensing unit is a value that changes according to a threshold voltage and mobility of the driving TFT, and the input voltage of the dummy sensing unit is a predetermined value in relation to the gain and the offset of the ADC.

17. The method for driving an organic light-emitting display device of claim 11, wherein the dummy sensing unit comprises a first dummy sensing unit and a second dummy sensing unit that is different from the first dummy sensing unit.

18. The method for driving an organic light-emitting display device of claim 17, wherein the first dummy sensing unit and the second dummy sensing unit are arranged to be spaced apart from each other based on the basic sensing unit.

19. The method for driving an organic light-emitting display device of claim 18, wherein the basic sensing unit and the first and second dummy sensing units are in a cascade connection in order of the first dummy sensing unit, the basic sensing unit, and the second dummy sensing unit, and the performing, by the sensing unit, the sensing operation for external compensation of the display panel comprises in sequence:

performing, by the first dummy sensing unit, a sensing operation on changes in a gain and an offset of the ADC, and performing, by the basic sensing unit, the sensing operation on the driving TFT, and performing, by the second dummy sensing unit, a sensing operation on changes in a gain and an offset of the ADC.

20. A sensing unit configured to perform a sensing operation for external compensation of a display panel, comprising:

a basic sensing unit configured to perform a sensing operation on a driving TFT comprised in the display panel; and a dummy sensing unit configured to perform a sensing operation on changes in a gain and an offset of an ADC, wherein the basic sensing unit and the dummy sensing unit are in a cascade connection to each other, and input voltages of the basic sensing unit and the dummy sensing unit are different from each other.

* * * * *